(12) United States Patent
Jeon et al.

(10) Patent No.: US 11,818,779 B2
(45) Date of Patent: *Nov. 14, 2023

(54) SYSTEM AND METHOD OF CONNECTING DEVICES VIA WI-FI NETWORK

(71) Applicant: Samsung Electronics Co., Ltd., Suwon-si (KR)

(72) Inventors: Hee-chul Jeon, Suwon-si (KR); Jung-ho Kim, Geumsan-gun (KR); Yong-gook Park, Yongin-si (KR); Woo-hyoung Lee, Yongin-si (KR); Sang-ok Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,370

(22) Filed: Nov. 2, 2022

(65) Prior Publication Data

US 2023/0058382 A1 Feb. 23, 2023

Related U.S. Application Data

(63) Continuation of application No. 17/368,265, filed on Jul. 6, 2021, now Pat. No. 11,523,447, which is a (Continued)

(30) Foreign Application Priority Data

Nov. 1, 2012 (KR) .......................... 10-2012-0123095

(51) Int. Cl.
*H04W 76/11* (2018.01)
*H04W 48/20* (2009.01)

(52) U.S. Cl.
CPC ............ *H04W 76/11* (2018.02); *H04W 48/20* (2013.01)

(58) Field of Classification Search
CPC ....... H04W 4/06; H04W 76/11; H04W 48/18; H04W 48/20; H04W 48/10
See application file for complete search history.

(56) References Cited

U.S. PATENT DOCUMENTS

| 7,586,889 B2 | 9/2009 | Gassho et al. |
| 8,014,779 B2 | 9/2011 | Kanada |

(Continued)

FOREIGN PATENT DOCUMENTS

| CN | 101237682 A | 8/2008 |
| CN | 102307350 A | 1/2012 |

(Continued)

OTHER PUBLICATIONS

Japanese Office Action dated Mar. 5, 2018, issued in Japanese Patent Application No. 2013-226491.

(Continued)

*Primary Examiner* — Syed Ali
(74) *Attorney, Agent, or Firm* — Jefferson IP Law, LLP

(57) ABSTRACT

A system and a method of connecting devices via a Wireless-Fidelity (Wi-Fi) network are provided. The method of communication-connecting an external device to an Access Point (AP) via a Wi-Fi network is performed by a device and includes operations of receiving device information of the external device from the external device that operates in an AP mode, accessing the external device that operates in the AP mode, by using the device information, and providing connection information relating to the AP to the external device, and wherein, when the connection information is provided to the external device, the external device terminates operating in the AP mode, and the external device then accesses the AP based on the connection information.

14 Claims, 11 Drawing Sheets

Related U.S. Application Data continuation of application No. 16/139,673, filed on Sep. 24, 2018, now Pat. No. 11,357,061, which is a continuation of application No. 14/062,177, filed on Oct. 24, 2013, now Pat. No. 10,111,266.

(56) References Cited

U.S. PATENT DOCUMENTS

| | | |
|---|---|---|
| 8,259,650 B2 | 9/2012 | Homma |
| 8,891,422 B2 | 11/2014 | Shinohara |
| 2004/0076120 A1 | 4/2004 | Ishidoshiro |
| 2004/0103275 A1 | 5/2004 | Ji et al. |
| 2005/0152305 A1 | 7/2005 | Ji et al. |
| 2006/0149969 A1 | 7/2006 | Song |
| 2006/0153085 A1 | 7/2006 | Willins et al. |
| 2006/0251256 A1 | 11/2006 | Asokan et al. |
| 2007/0060128 A1 | 3/2007 | Kil |
| 2007/0080845 A1 | 4/2007 | Amand |
| 2007/0086394 A1 | 4/2007 | Yamada et al. |
| 2009/0043998 A1 | 2/2009 | Doumuki |
| 2009/0196211 A1 | 8/2009 | Wentink |
| 2010/0004648 A1 | 1/2010 | Edwards et al. |
| 2010/0205655 A1 | 8/2010 | Mokuya |
| 2010/0246544 A1* | 9/2010 | Brisebois ............... H10N 35/00 370/338 |
| 2010/0296441 A1 | 11/2010 | Barkan |
| 2011/0280233 A1 | 11/2011 | Choi et al. |
| 2011/0305227 A1 | 12/2011 | Heerboth |
| 2011/0319056 A1 | 12/2011 | Toy et al. |
| 2012/0089719 A1 | 4/2012 | Cha et al. |
| 2012/0188991 A1 | 7/2012 | Kholaif et al. |
| 2013/0016710 A1 | 1/2013 | Shinohara |
| 2013/0016760 A1 | 1/2013 | Shellhammer et al. |
| 2013/0031586 A1 | 1/2013 | Jeon et al. |
| 2013/0042031 A1 | 2/2013 | Jeon et al. |
| 2013/0114540 A1 | 5/2013 | Ding et al. |
| 2013/0281020 A1 | 10/2013 | Montemurro |
| 2013/0309971 A1* | 11/2013 | Kiukkonen ........... H04W 12/50 455/41.2 |
| 2013/0331141 A1 | 12/2013 | Montemurro |
| 2014/0068261 A1 | 3/2014 | Malek et al. |
| 2014/0085655 A1 | 3/2014 | Matsubara |
| 2014/0086134 A1 | 3/2014 | Smadi et al. |
| 2014/0092755 A1 | 4/2014 | Van De Ven et al. |
| 2014/0244063 A1 | 8/2014 | Davis et al. |
| 2015/0040195 A1* | 2/2015 | Park ..................... H04W 12/062 726/4 |
| 2016/0183174 A1* | 6/2016 | Xie ....................... H04W 48/18 455/436 |
| 2016/0345368 A1 | 11/2016 | Reshef et al. |
| 2017/0027005 A1 | 1/2017 | Sung |
| 2017/0034419 A1 | 2/2017 | Brockway et al. |
| 2017/0126488 A1 | 5/2017 | Cordeiro et al. |
| 2017/0135138 A1 | 5/2017 | Zhou |
| 2017/0150535 A1 | 5/2017 | Wynn |
| 2017/0208431 A1 | 7/2017 | Suzuki et al. |
| 2017/0223516 A1 | 8/2017 | Raleigh |
| 2017/0272929 A1 | 9/2017 | Moldavsky et al. |
| 2017/0364048 A1 | 12/2017 | Park et al. |

FOREIGN PATENT DOCUMENTS

| | | |
|---|---|---|
| CN | 102612116 A | 7/2012 |
| CN | 102694814 A | 9/2012 |
| CN | 102711282 A | 10/2012 |
| EP | 2 480 044 B1 | 6/2016 |
| JP | 2003-143156 A | 5/2003 |
| JP | 2005-142792 A | 6/2005 |
| JP | 2008-219550 A | 9/2008 |
| JP | 2012-199620 A | 10/2012 |
| KR | 10-2007-0083094 A | 8/2007 |
| KR | 10-2013-0014185 A | 2/2013 |
| KR | 10-2013-0017912 A | 2/2013 |
| WO | 2006/106393 A2 | 10/2006 |
| WO | 2011/132761 A1 | 10/2011 |
| WO | 2011/144101 A2 | 11/2011 |
| WO | 2013/018963 A1 | 2/2013 |
| WO | 2013/024945 A1 | 2/2013 |

OTHER PUBLICATIONS

Samsung, https://downloadcenter.samsung.com/content/UM/201403/20140310195439918/USERS_WF455AG-03159A-07_AA.pdf, Dec. 13, 2013.

Samsung Product Support Network, https://www.youtube.com/watch?v=ZWi4OWQcwJA, Jul. 18, 2021.

Chinese Office Action dated Jul. 3, 2020, issued in Chinese Application No. 201811119734.6.

* cited by examiner

SYSTEM AND METHOD OF CONNECTING DEVICES VIA WI-FI NETWORK

CROSS-REFERENCE TO RELATED PATENT APPLICATION(S)

This application is a continuation application of prior application Ser. No. 17/368,265, filed on Jul. 6, 2021, which is a continuation application of prior application Ser. No. 16/139,673, filed on Sep. 24, 2018, which has issued as U.S. Pat. No. 11,357,061 on Jun. 7, 2022, which is a continuation application of prior application Ser. No. 14/062,177, filed on Oct. 24, 2013, which has issued as U.S. Pat. No. 10,111,266, on Oct. 23, 2018, and was based on and claimed priority under 35 U.S.C. § 119(a) of a Korean patent application number 10-2012-0123095, filed on Nov. 1, 2012 in the Korean Intellectual Property Office, the disclosure of which is incorporated by reference herein in its entirety.

TECHNICAL FIELD

The present disclosure relates to a system and method of connecting a device and an external device via an access point in a Wireless-Fidelity (Wi-Fi) network.

BACKGROUND

Recently, various convergence services are provided to devices via a network formed between the devices. However, forming a network between the devices is complicated because the devices require different setting configurations and methods, and there are many different networks. As a result, users are not able to easily form a network between the devices. Recently, a technology of forming a network between devices by using Near Field Communication (NFC) is being developed. However, use of NFC to form a network between devices requires every device to have an NFC reader embedded therein. Consequently, applying the technology to a device that does not include the NFC reader is difficult, and the technology increases the manufacturing costs of the device. Therefore, there is an increasing demand for a new technology to enables a user to easily form a network between devices via a Wireless-Fidelity (Wi-Fi) network that is commonly used in various devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a system and method of connecting devices via a Wireless-Fidelity (Wi-Fi) network, whereby an external device can be connected to an Access Point (AP) of the Wi-Fi network.

Another aspect of the present disclosure is to provide a system and method of connecting devices via a Wi-Fi network, whereby a device that is connected to an AP of the Wi-Fi network can enable an external device to participate in the Wi-Fi network.

In accordance with an aspect of the present disclosure, a method of connecting an external device to an AP via a Wireless-Fidelity (Wi-Fi) network is provided. The method is performed by a device and includes operations of receiving device information of the external device from the external device that operates in an AP mode, accessing the external device that operates in the AP mode, by using the device information, and providing connection information relating to the AP to the external device, and wherein, when the connection information is provided to the external device, the external device terminates operating in the AP mode, and the external device then accesses the AP based on the connection information.

In accordance with an aspect of the present disclosure, the method may further include, when the device information is received, an operation of discontinuing accessing the AP, and when the connection information is provided to the external device, an operation of re-accessing the AP.

In accordance with an aspect of the present disclosure, the external device may broadcast the device information of the external device at a predetermined signal strength.

In accordance with an aspect of the present disclosure, the device information of the external device may include a Service Set Identifier (SSID) and a Medium Access Control (MAC) address of the external device.

In accordance with an aspect of the present disclosure, the method may further include an operation of receiving password information from the external device, the providing the connection information may include an operation of providing the connection information to the external device when a password input to the device corresponds to a password included in the password information.

In accordance with an aspect of the present disclosure, the password included in the password information may be displayed on a screen of the external device, and the password that is displayed on the screen of the external device may be used by a user of the device to input a password into the device.

In accordance with an aspect of the present disclosure, the password included in the password information may be displayed on a screen of a remote controller of the external device, and the password that is displayed on the screen of the remote controller may be used by a user of the device to input a password into the device.

In accordance with an aspect of the present disclosure, the password information may include guide information relating to a method of checking the password included in the password information, and when the guide information is displayed on a screen of the device, the guide information may be used by a user of the device to input a password into the device.

In accordance with an aspect of the present disclosure, the password included in the password information may be a model name of the external device and may be displayed on an outer surface of the external device, and the model name may be used by a user of the device to input a password into the device.

In accordance with an aspect of the present disclosure, the operation of accessing the external device may be performed via an ad-hoc network.

In accordance with another aspect of the present disclosure, a method of connecting to an AP via a Wireless-Fidelity (Wi-Fi) network is included. The method is performed by an external device and includes operations of changing a networking mode of the external device into an AP mode, providing device information of the external device to a device, accessing the device in response to an access request from the device based on the device information, receiving connection information relating to the AP from the device, terminating the AP mode when the connection information is received, and accessing the AP based on the connection information.

In accordance with an aspect of the present disclosure, when the device information is provided to the device, connection between the device and the AP may be discontinued, and when the external device receives the connection information from the device, the device and the AP may be re-connected.

In accordance with an aspect of the present disclosure, the operation of providing the device information may include an operation of broadcasting the device information with a predetermined signal strength.

In accordance with an aspect of the present disclosure, the device information of the external device may include information relating to a Service Set Identifier (SSID) and an MAC address of the external device.

In accordance with an aspect of the present disclosure, the method may further include an operation of providing password information to the device, and when a password input to the device corresponds to a password included in the password information is input to the device, the connection information may be provided from the device.

In accordance with an aspect of the present disclosure, the method may further include an operation of displaying the password, which is included in the password information, on a screen of the external device, and the password that is displayed on the screen may be used by a user of the device to input a password into the device.

In accordance with an aspect of the present disclosure, the password included in the password information may be displayed on a screen of a remote controller of the external device, and the password that is displayed on the screen of the external device may be used by a user of the device so as to input a password into the device.

In accordance with an aspect of the present disclosure, the password information may include guide information relating to a method of checking the password included in the password information, and when the guide information is displayed on a screen of the device, the guide information may be used by a user of the device to input a password into the device.

In accordance with an aspect of the present disclosure, the password included in the password information may be a model name of the external device and the password may be displayed on an outer surface of the external device, and the model name may be used by a user of the device to input a password into the device.

In accordance with an aspect of the present disclosure, the operation of accessing the device may be performed via an ad-hoc network.

In accordance with another aspect of the present disclosure, a device for connecting an external device to an AP via a Wireless-Fidelity (Wi-Fi) network is provided. The device includes an information obtaining unit configured to receive device information of the external device from the external device that operates in an AP mode, an accessing unit configured to access the external device that operates in the AP mode, by using the device information, and a connection information providing unit configured to provide connection information relating to the AP to the external device, and wherein, when the connection information is provided to the external device, the external device terminates operating in the AP mode, and the external device then accesses the AP based on the connection information.

In accordance with another aspect of the present disclosure, an external device that is connected to an AP via a Wireless-Fidelity (Wi-Fi) network is provided. The external device includes an information providing unit configured to provide device information of the external device to a device, and an accessing unit configured to access the device in response to an access request from the device based on the device information, to receive connection information relating to the AP from the device, and to access the AP based on the connection information, and wherein the accessing unit provides the device information to the device after the accessing unit changes a networking mode of the external device into an AP mode, and wherein, when the connection information is received, the accessing unit terminates the AP mode, and then accesses the AP.

In accordance with another aspect of the present disclosure, a non-transitory computer-readable recording medium is provided. The non-transitory computer-readable medium has recorded thereon a program which, when executed by a computer, performs the method of the first aspect of the present disclosure.

In accordance with another aspect of the present disclosure, a non-transitory computer-readable recording medium is provided. The non-transitory computer-readable recording medium having recorded thereon a program which, when executed by a computer, performs the method of the second aspect of the present disclosure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will also be understood that when an element is referred to as being "connected to" another element, the element may be directly connected to the other element, or electrically connected to the other element while intervening elements may also be present. In addition, when a part "includes" or "comprises" an element, unless there is a particular description contrary thereto, the part may further include other elements, not excluding the other elements.

Expressions such as "at least one of," when preceding a list of elements, modify the entire list of elements and do not modify the individual elements of the list.

As a non-exhaustive illustration only, a device described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), an optical disc player, a set-top box, and the like capable of wireless communication or network communication consistent with that disclosed herein.

Figure 1:
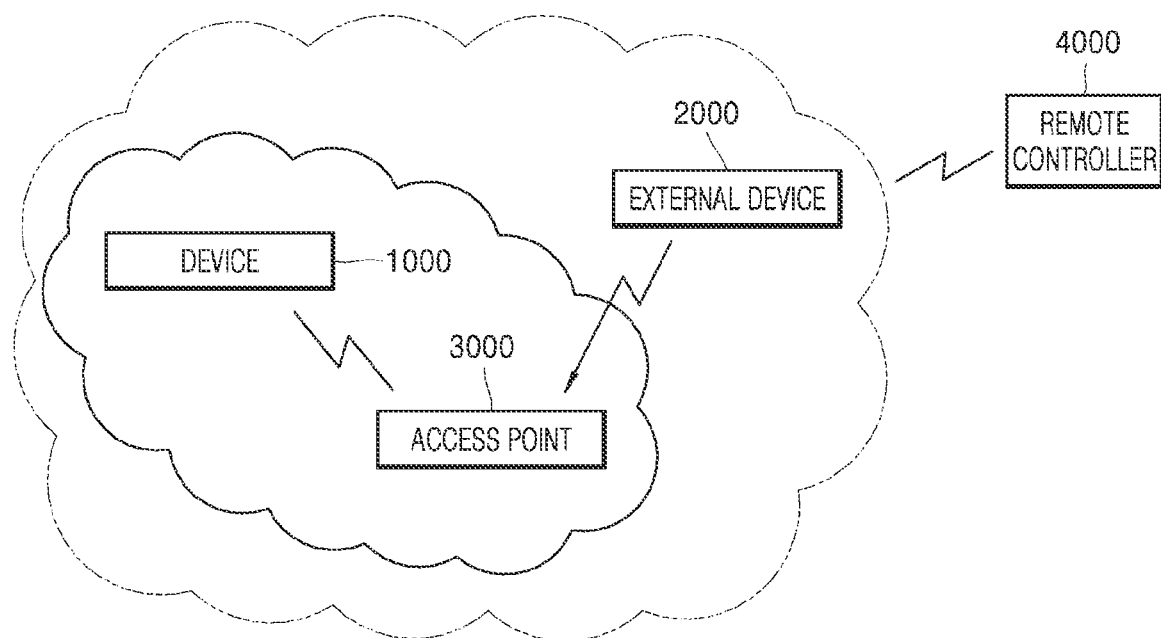
FIG. 1 illustrates a communication connection system using a Wireless-Fidelity (Wi-Fi) network according to an embodiment of the present disclosure.

FIG. 1 illustrates a communication connection system using a Wireless-Fidelity (Wi-Fi) network according to an embodiment of the present disclosure.

Referring to FIG. 1, the communication connection system using a Wi-Fi network may include a device 1000, an external device 2000, an Access Point (AP) 3000, and a remote controller 4000.

The device 1000 may access the AP 3000 in the Wi-Fi network, and may provide, to the AP 3000, connection information for accessing the AP 3000. The connection information is used for accessing the AP 3000 via the Wi-Fi network. As an example, the connection information may include, but is not limited to, a Service Set Identifier (SSID) and a Media Access Control (MAC) address of the AP 3000, a password for accessing the AP 3000, and/or the like. In more detail, the device 1000 that currently accesses the AP 3000 may discontinue accessing the AP 3000 and may then access the external device 2000 and may provide the connection information relating to the AP 3000 to the external device 2000. Thereafter, the device 1000 may terminate accessing the external device 2000 and then may re-access the AP 3000.

The external device 2000 may access the AP 3000 by using the connection information relating to the AP 3000 which is received from the device 1000, and may then perform communication with the device 1000 via the AP 3000. The external device 2000 may change the external device's 2000 networking mode from a client mode to an AP mode so as to access the device 1000, and may provide device information of the external device 2000 to the device 1000. The networking mode in the Wi-Fi network may include, but is not limited to, the AP mode in which the external device 2000 operates as an AP, and the client mode in which the external device 2000 operates as a client. In addition, when the device 1000 accesses the external device 2000 by using the device information, the external device 2000 may receive the connection information relating to the AP 3000 from the device 1000 and may then access the AP 3000 by using the connection information.

In addition, a predetermined password may be used for the device 1000 to access the external device 2000. Password information relating to the password for accessing the external device 2000 may be displayed on the remote controller 4000 of the external device 2000 or another remote controller (not shown). For example, the password information may include, but is not limited to, a password value, guide information relating to checking the password value, and/or the like.

Figure 2:
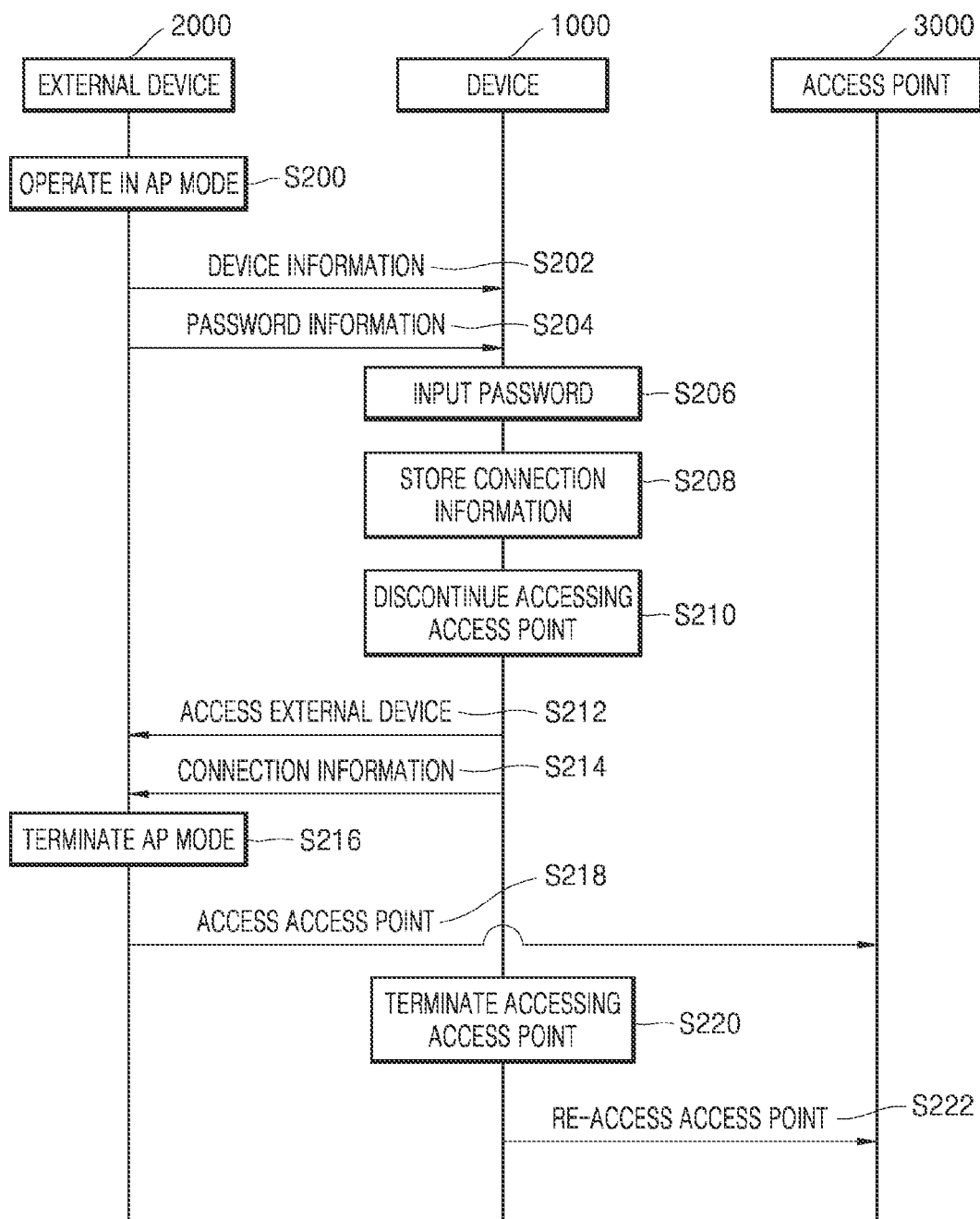
FIG. 2 is a flowchart of a method of connecting communication via a Wi-Fi network according to an embodiment of the present disclosure.

FIG. 2 is a flowchart of a method of connecting communication via a Wi-Fi network according to an embodiment of the present disclosure.

Referring to FIG. 2, at operation S200, the external device 2000 changes the external device's 2000 networking mode to an AP mode. The networking mode may include an AP mode in which the external device 2000 operates as an AP, and a client mode in which the external device 2000 operates as a client. The external device 2000 may change the external device's 2000 networking mode from the client mode to the AP mode so as to access the device 1000.

At operation S202, the external device 2000 transmits device information of the external device 2000 to the device 1000. The external device 2000 may broadcast, to the device 1000, an SSID, a MAC address, device type information, and/or the like which relate to the external device 2000, with a predetermined signal strength. In addition, the external device 2000 may transmit the device information to the device 1000 via a Vendor Specific Information Element (VSIE) of Institute of Electrical and Electronics Engineers (IEEE) 802.11.

In addition, the external device 2000 may transmit the device information to the device 1000 and may stand by for a predetermined time period so as to receive connection information from the device 1000. When the connection information is received from the device 1000 within the predetermined time period, the external device 2000 may attempt to access the AP 3000. When the connection information is not received from the device 1000 within the predetermined time period, the external device 2000 may terminate the AP mode and may output notice information indicating non-reception of the connection information. However, various embodiments of the present disclosure are not limited thereto.

In addition, the external device 2000 may transmit the device information to the device 1000 and may simultaneously request the device 1000 for information that is necessary for accessing the AP 3000.

At operation S204, the external device 2000 transmits, to the device 1000, password information relating to a password that is used by the device 1000 so as to access the external device 2000 that operates in the AP mode. The external device 2000 may broadcast, to the device 1000, the password information relating to the password for connection with the device 1000. For example, the password information may include, but is not limited to, a password value, guide information relating to checking the password value, and/or the like. In addition, the guide information relating to checking the password value may include, but is not limited to, guide information for making the password value displayed on the external device 2000 or the remote controller 4000 of the external device 2000, guide information indicating that predetermined letters, which are displayed on an exterior surface of the external device 2000, correspond to a password. The guide information relating to checking the password value may include guide information indicating that the password is displayed on the external device 2000 when a predetermined button included in the remote controller 4000 is pressed, and guide information indicating that predetermined numbers included in a model name of the external device 2000 are the password.

At operation S206, the device 1000 receives a user input with respect to a password input. The device 1000 may compare a password that is input by a user with the password that is received from the external device 2000, so that the device 1000 may determine whether to access the external device 2000. However, various embodiments of the present disclosure are not limited thereto, and the device 1000 may provide the input password to the external device 2000 and may allow the external device 2000 to determine whether to permit the access of the device 1000.

The password for accessing the external device 2000 may be displayed on a screen of the external device 2000, and the user may input the password, which is displayed on a screen of the external device 2000, to the device 1000. In this case, guide information indicating how to display the password on the screen of the external device 2000 may be displayed on a screen of the device 1000. For example, guide information indicating that the password is displayed on the external device 2000 when a predetermined button of the remote controller 4000 of the external device 2000 is pressed may be displayed on the device 1000.

In addition, the password for accessing the external device 2000 may be displayed on an outer surface of the external device 2000 during the manufacture of the external device 2000. In this case, guide information relating to checking the password that is displayed on the outer surface of the external device 2000 may be displayed on the device 1000.

At operation S208, the device 1000 stores the connection information relating to the AP 3000. The connection information relating to the AP 3000 may include various types of information that are necessary for accessing the AP 3000 in the Wi-Fi network. For example, the connection information may include, but is not limited to, an SSID of the AP 3000, and a password for accessing the AP 3000.

At operation S210, the device 1000 discontinues accessing the AP 3000. When the device 1000 receives the device information from the external device 2000, the device 1000 may discontinue accessing the AP 3000. When the password that is input by the user matches with the password that is received from the external device 2000, the device 1000 may discontinue accessing the AP 3000 but one or more various embodiments of the present disclosure are not limited thereto.

At operation S212, the device 1000 accesses the external device 2000. The device 1000 may access the external device 2000 based on the device information received from the external device 2000. The device 1000 may access the external device 2000 that operates in the AP mode, based on an SSID and MAC address of the external device 2000, and may transmit the password, which is input at operation S206, to the external device 2000 so as to access the external device 2000. However, various embodiments of the present disclosure are not limited thereto.

At operation S214, the device 1000 provides the connection information to the external device 2000. After the device 1000 accesses the external device 2000, the device 1000 may provide, to the external device 2000, the connection information that is stored at operation S208. When the device 1000 accesses the external device 2000, the external device 2000 may request the device 1000 for the connection information relating to the AP 3000, and in response to the request from the external device 2000, the device 1000 may transmit, to the external device 2000, the connection information that is stored at operation S208.

At operation S216, the external device 2000 terminates the AP mode. When the external device 2000 receives the connection information from the device 1000, the external device 2000 may terminate the AP mode and may change the external device's 2000 networking mode to the client mode.

At operation S218, the external device 2000 accesses the AP 3000. The external device 2000 may access the AP 3000 based on the received connection information. The external device 2000 may request access to the AP 3000 by using the SSID of the AP 3000 which is included in the connection information, and may provide the password included in the connection information to the AP 3000.

At operation S220, the device 1000 terminates accessing the external device 2000. After the device 1000 transmits the connection information to the external device 2000, the device 1000 may terminate accessing the external device 2000. After the device 1000 receives, from the external device 2000, notice information indicating that the external device 2000 accesses the AP 3000, and then the device 1000 checks that the external device 2000 accesses the AP 3000, the device 1000 may terminate the connection with the external device 2000. However, various embodiments of the present disclosure are not limited thereto.

At operation S222, the device 1000 re-accesses the AP 3000. The device 1000 may re-access the AP 3000 based on the connection information that is stored at operation S208.

According to various embodiments of the present disclosure, the device 1000 and the external device 2000 may be communication-connected to each other via the AP 3000, and then the device 1000 may control the external device 2000 or may exchange data with the external device 2000 based on a user input.

Figure 3:
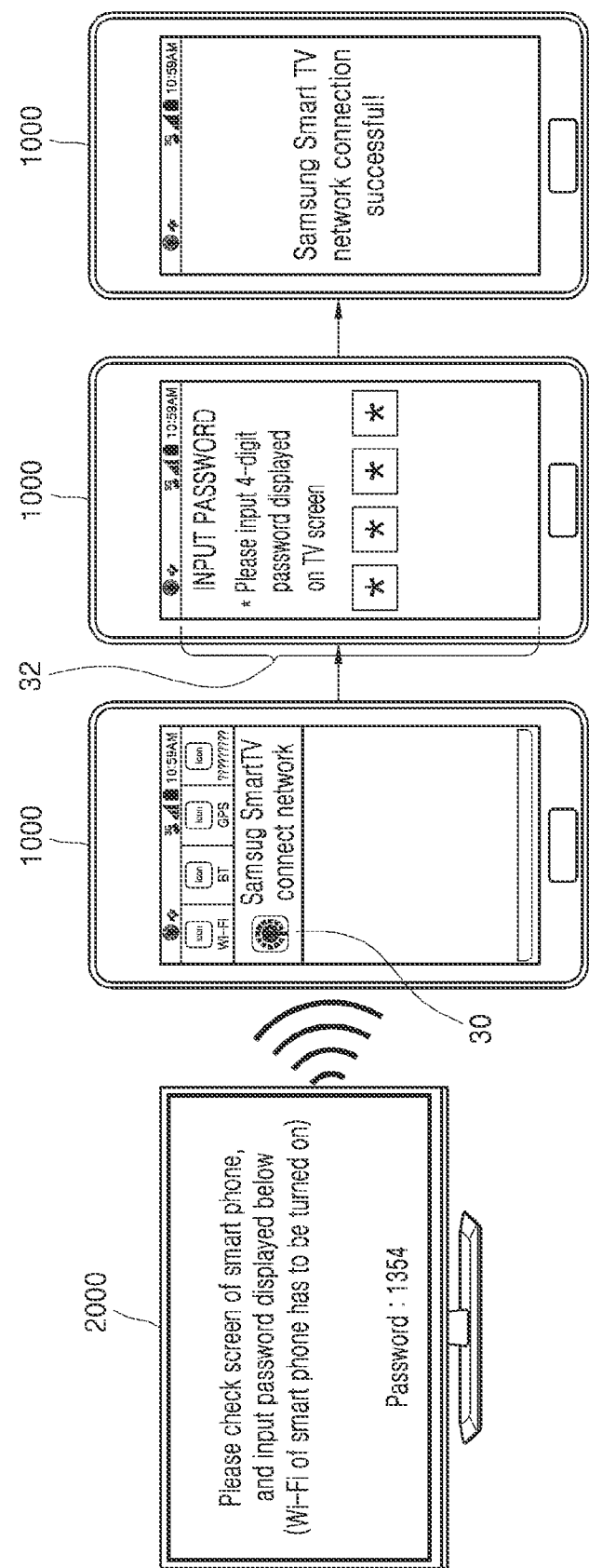
FIG. 3 illustrates an example in which guide information relating to a communication connection is displayed on a screen of an external device, and a predetermined password is input to a device according to an embodiment of the present disclosure.

FIG. 3 illustrates an example in which guide information relating to a communication connection is displayed on a screen of an external device, and a predetermined password is input to a device according to an embodiment of the present disclosure.

Referring to FIG. 3, the external device 2000 may be a smart Television (TV), and the device 1000 may be a smart phone. In order to be connected with the device 1000 via the AP 3000, the external device 2000 may display guide information for connection with the device 1000 on the screen of the external device 2000. For example, a password for network connection, and guide information relating to checking and inputting the password may be displayed on the screen of the external device 2000.

In addition, after the device 1000 receives a network connection request including device information from the external device 2000, the device 1000 may display a button 30 on a screen of the device 1000 so as to receive a user input for the network connection.

When the button 30 is selected, the device 1000 may display a user interface 32 for a password input on the screen of the device 1000, and when a correct password is input by a user, the device 1000 and the external device 2000 may be connected to each other via the AP 3000.

Thereafter, the device 1000 may display information indicating a communication connection between the device 1000 and the external device 2000 on the screen of the device 1000.

Figure 4:
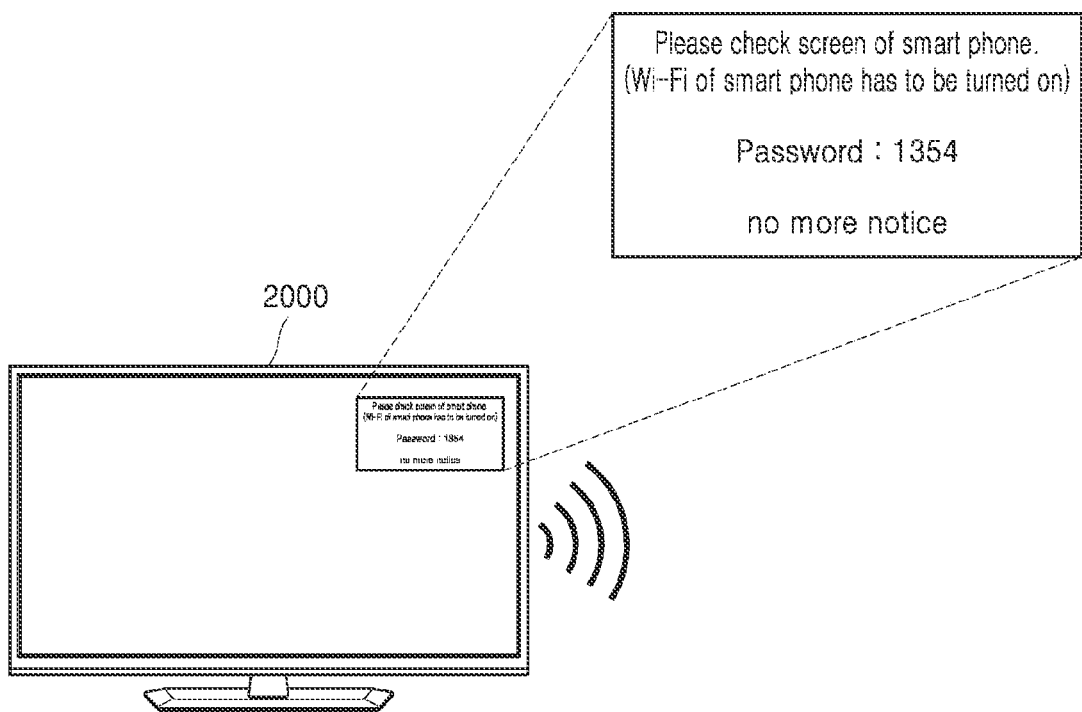
FIG. 4 illustrates an example in which guide information for a communication connection is displayed on a screen of an external device, and a predetermined password is input to a device according to an embodiment of the present disclosure.

FIG. 4 illustrates an example in which guide information for a communication connection is displayed on a screen of an external device, and a predetermined password is input to a device according to an embodiment of the present disclosure.

Referring to FIG. 4, the external device 2000 may be a smart TV, and may display guide information for connection with the device 1000 via the AP 3000 on a portion of a screen of the external device 2000. The guide information may be displayed on a separate pop-up window. However, various embodiments of the present disclosure are not limited thereto.

Figure 5:
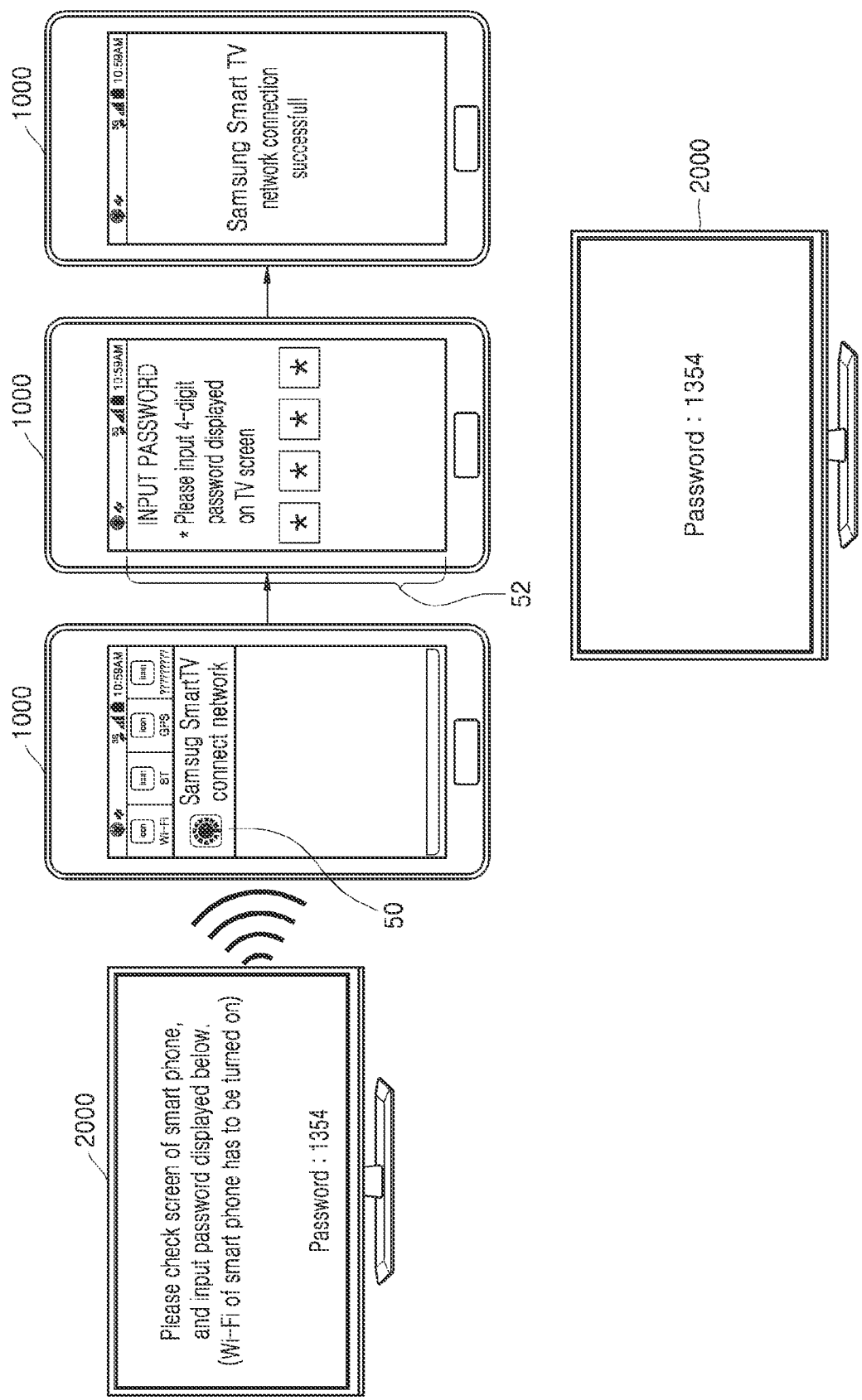
FIG. 5 illustrates an example in which guide information for making a password displayed on a screen of an external device is displayed on a screen of a device, and a predetermined password is input to a device according to an embodiment of the present disclosure.

FIG. 5 illustrates an example in which guide information for making a password displayed on a screen of an external device is displayed on a screen of a device, and a predetermined password is input to a device 1000 according to an embodiment of the present disclosure.

According to various embodiments of the present disclosure, a password value for accessing the external device 2000 may not be transmitted to the device 1000.

Referring to FIG. 5, the external device 2000 may be a smart TV, and the device 1000 may be a smart phone. The external device 2000 may transmit, to the device 1000, device information and password information for a network connection. The password information may include information that is used in confirmation of a password for accessing the external device 2000.

The device 1000 may receive the device information and the password information, and may display a button 50 on a screen of the device 1000 so as to receive a user input for the network connection.

When the button 50 is selected, the device 1000 may display a user interface 52 for a password input on its screen, and may display guide information on the user interface 52, wherein the guide information is used by a user so as to check the password, based on the password information. For example, the device 1000 may display the guide information of "TV remote controller menu button→setting→PW check" on the screen.

Thereafter, when the user presses a predetermined button of the remote controller 4000 of the external device 2000 according to the guide information, the password may be displayed on a screen of the external device 2000, and when the user inputs a correct password into the device 1000, the device 1000 and the external device 2000 may be connected to each other via the AP 3000.

Thereafter, the device 1000 may display information indicating as to the communication connection between the device 1000 and the external device 2000 on the screen of the device 1000.

Figure 6:
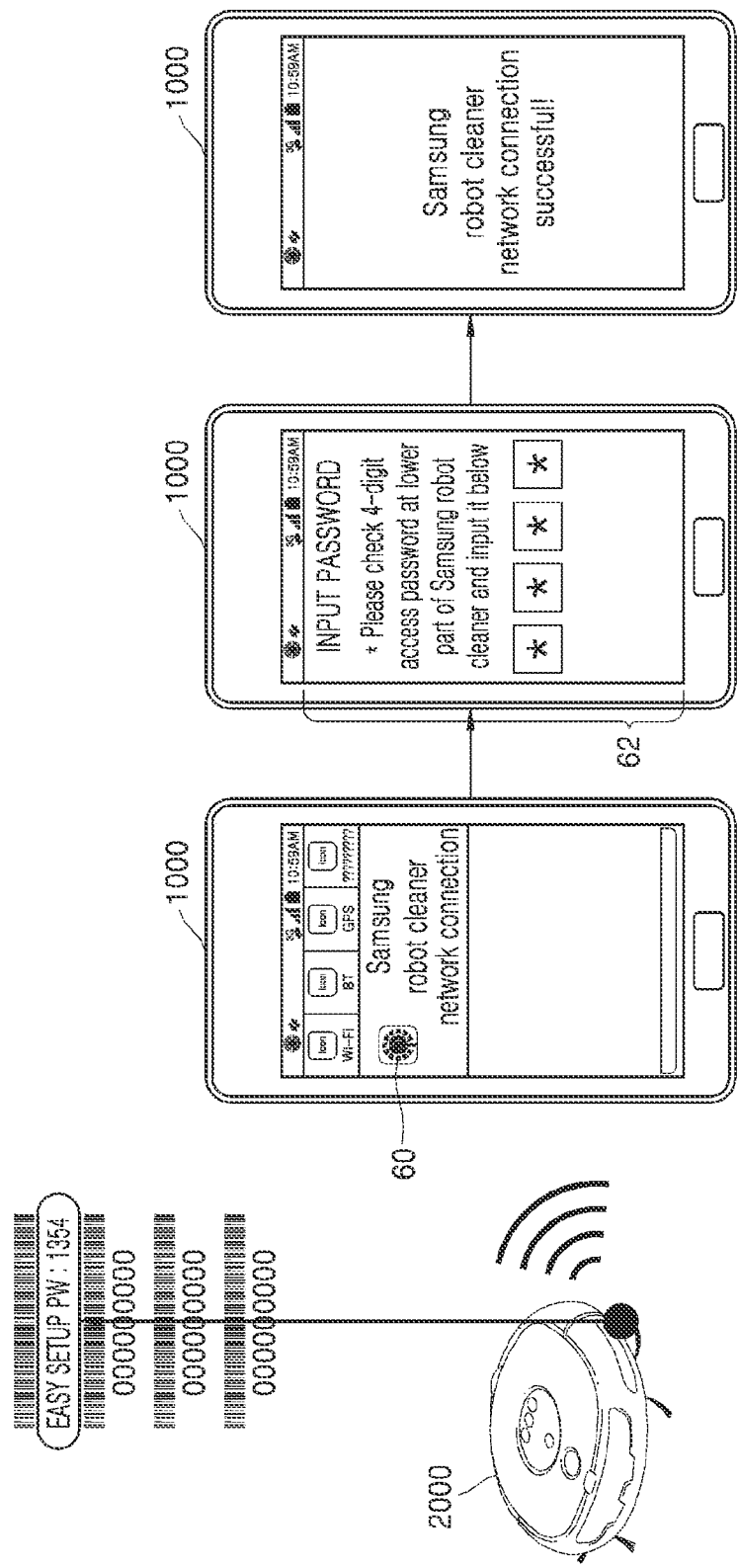
FIG. 6 illustrates an example in which guide information relating to checking a password is displayed on a screen of a device, and a predetermined password is input to a device according to an embodiment of the present disclosure.

FIG. 6 illustrates an example in which guide information relating to checking a password is displayed on a screen of a device, and a predetermined password is input to a device according to an embodiment of the present disclosure.

Referring to FIG. 6, the external device 2000 may be a cleaner, and the device 1000 may be a smart phone. The external device 2000 may transmit, to the device 1000, device information and password information for network connection. For example, the password may be displayed on a lower part (e.g., a bottom surface) of the external device 2000. The password may be, but is not limited to, a predetermined number or a model name of the external device 2000. In addition, the password information may include information relating to checking the password for accessing the external device 2000.

The device 1000 may receive the device information and the password information, and may display a button 60 on a screen of the device 1000 so as to receive a user input for the network connection. When the button 60 is selected, the device 1000 may display a user interface 62 for a password input on the screen of the device 1000, and may display guide information on the user interface 62, wherein the guide information is used by a user so as to check the password, based on the password information. For example, the device 1000 may display the guide information "Please check the 4-digit access password at a lower part of the robot cleaner and input it here" on the screen of the device 1000.

Thereafter, when the user inputs a correct password into the device 1000 according to the guide information, the device 1000 and the external device 2000 may be connected to each other via the AP 3000. Then, the device 1000 may display information indicating as to the communication connection between the device 1000 and the external device 2000 on the screen of the device 1000.

Figure 7:
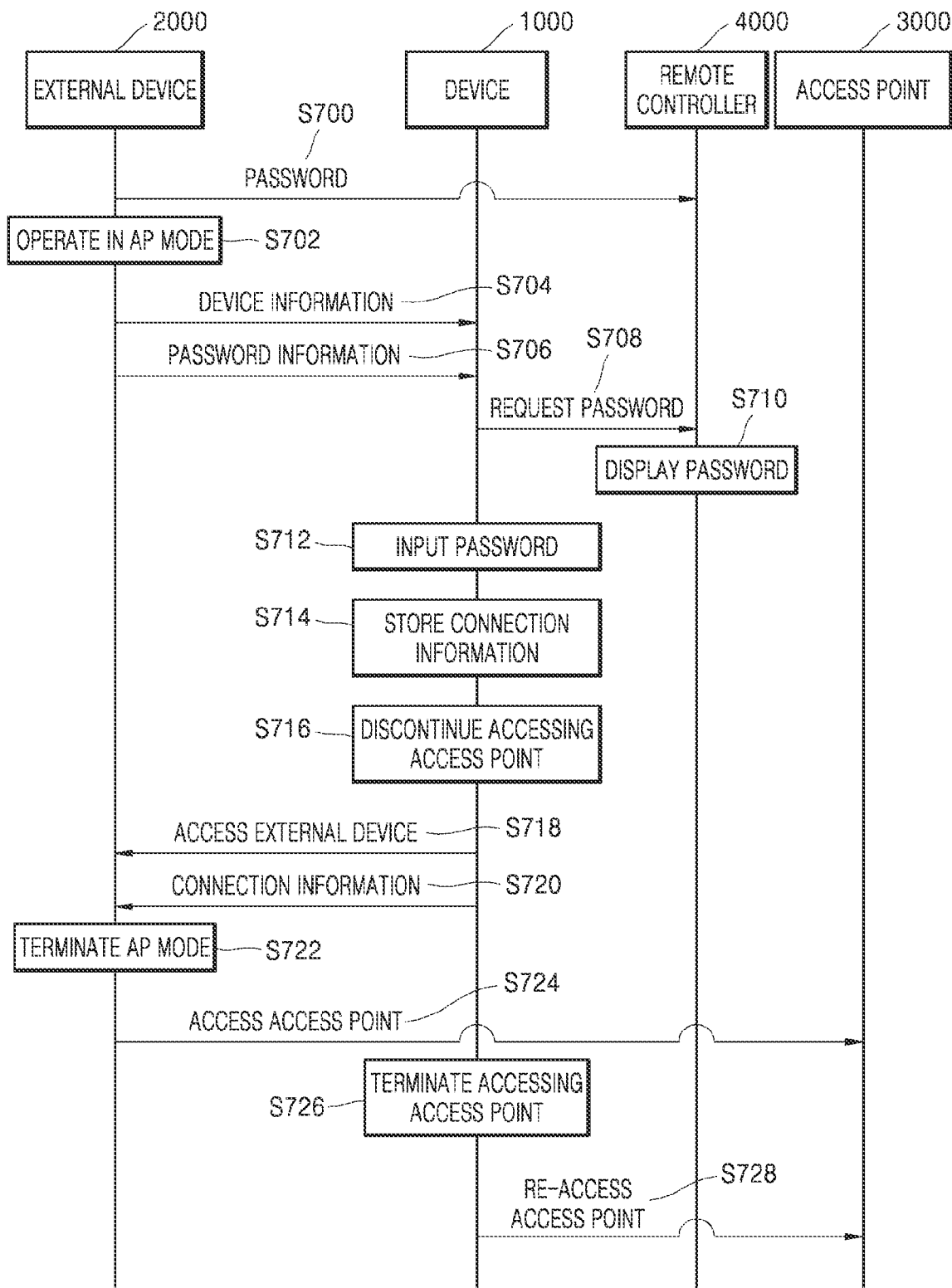
FIG. 7 is a flowchart of a method of connecting communication via a Wi-Fi network according to an embodiment of the present disclosure.

FIG. 7 is a flowchart of a method of connecting communication via a Wi-Fi network according to an embodiment of the present disclosure.

Referring to FIG. 7, a predetermined password may be displayed on a screen of the remote controller 4000 of the external device 2000.

At operation S700, the external device 2000 transmits, to the remote controller 4000, a password for accessing the external device 2000 that operates in an AP mode. For example, the external device 2000 may transmit the password to the remote controller 4000 via at least one of Radio Frequency (RF) communication, Near Field Communication (NFC), Bluetooth communication, Wi-Fi communication, and/or the like. However, various embodiments of the present disclosure are not limited to such communication technologies.

At operation S702, the external device 2000 changes the external device's 2000 networking mode to the AP mode. The networking mode may include the AP mode in which the external device 2000 operates as an AP, and a client mode in which the external device 2000 operates as a client. The external device 2000 may change the external device's 2000 networking mode from the client mode to the AP mode so as to be connected with the device 1000.

At operation S704, the external device 2000 transmits device information of the external device 2000 to the device 1000. For example, the external device 2000 may broadcast an SSID, a MAC address, and device type information that are of the external device 2000 to the device 1000. In addition, the external device 2000 may transmit the device information to the device 1000 and may stand by for a predetermined time period so as to receive connection information from the device 1000. When the connection information is received from the device 1000 within the predetermined time period, the external device 2000 may attempt to access the AP 3000. When the connection information is not received from the device 1000 within the predetermined time period, the external device 2000 may terminate the AP mode and may output notice information indicating as to the non-reception of the connection information. However, various embodiments of the present disclosure are not limited thereto.

At operation S706, the external device 2000 transmits, to the device 1000, password information relating to a password that is used by the device 1000 so as to access the external device 2000 that operates in the AP mode. The external device 2000 may broadcast, to the device 1000, the password information relating to the password for connection with the device 1000. For example, the password information may include, but is not limited to, a password value, guide information relating to checking the password value, or the like. In addition, the guide information relating to checking the password value may include, but is not limited to, guide information that is required by the user so as to check the password value via the remote controller 4000. For example, the guide information relating to checking the password value may include a sentence indicating that a password is displayed on a screen of the remote controller 4000 when a predetermined button included in the remote controller 4000 is pressed.

At operation S708, the device 1000 requests the remote controller 4000 to display the password. The device 1000 may display the guide information relating to checking the password on the screen of the device 1000, and may request the remote controller 4000 to display the password, based on a user input according to the guide information.

At operation S710, the remote controller 4000 displays the password on the screen of the remote controller 4000. The remote controller 4000 may display the password, which is received from the external device 2000 in operation S700, on the screen of the remote controller 4000.

According to various embodiments of the present disclosure, the password may be displayed on the remote controller 4000 although the device 1000 does not request the remote controller 4000 to display the password at operation S708. For example, when a predetermined button of the remote controller 4000 is selected by a user, the password may be displayed on the screen of the remote controller 4000. In addition, for example, without the separate user input, the password may be displayed on the screen of the remote controller 4000 for a predetermined time period.

Operations S712 through S728 correspond to operations S206 through S222, and thus, descriptions about operations S712 through S728 are omitted.

Figure 8:
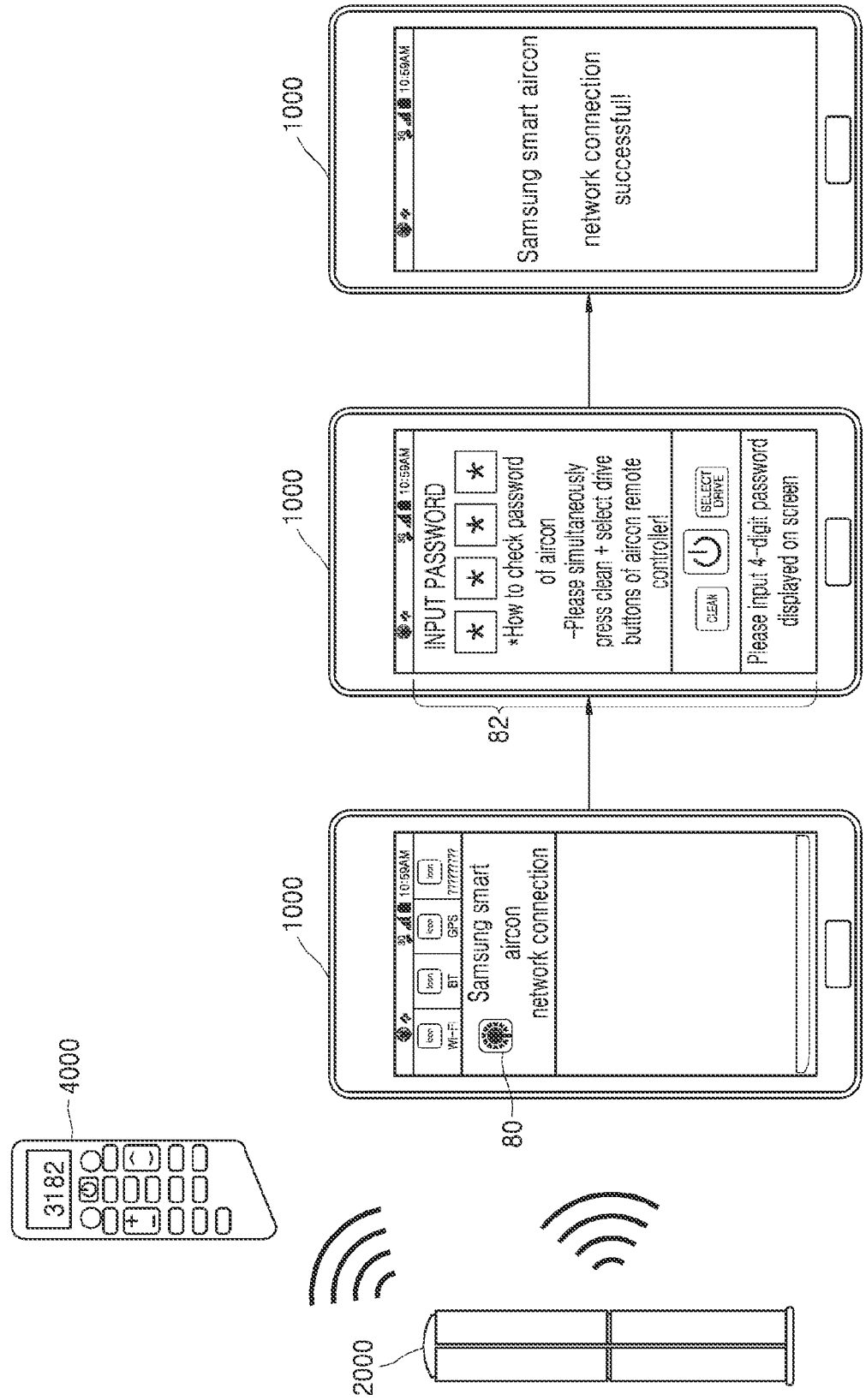
FIG. 8 illustrates an example in which a password is displayed on a screen of a remote controller of an external device, and then is input to a device according to an embodiment of the present disclosure.

FIG. 8 illustrates an example in which a password is displayed on a screen of a remote controller of an external device and then is input to a device according to an embodiment of the present disclosure.

According to various embodiments of the present disclosure, a password value for accessing the external device 2000 may be displayed on the remote controller 4000.

Referring to FIG. 8, the external device 2000 may be an air-conditioner, and the device 1000 may be a smart phone. The external device 2000 may transmit, to the device 1000, device information and password information for a network connection. The password information may include information relating to checking the password for accessing the external device 2000.

The device 1000 may receive the device information and the password information, and may display a button 80 on a screen of the device 1000 so as to receive a user input for the network connection.

When the button 80 is selected, the device 1000 may display a user interface 82 for a password input on a screen of the device 1000, and may display guide information on the user interface 82, wherein the guide information is used by a user so as to check the password, based on the password information. For example, the device 1000 may display guide information on a screen of the remote controller 4000, wherein the guide information informs the user that a predetermined password is displayed on the screen of the remote controller 4000 when a predetermined button of the remote controller 4000 is pressed.

Thereafter, when the user presses the predetermined button of the remote controller 4000 of the external device 2000 according to the guide information, the password may be displayed on the screen of the remote controller 4000, and when the user inputs a correct password into the device 1000, the device 1000 and the external device 2000 may be connected to each other via the AP 3000.

Thereafter, the device 1000 may display information indicating the communication connection between the device 1000 and the external device 2000 on the screen of the device 1000.

Figure 9:
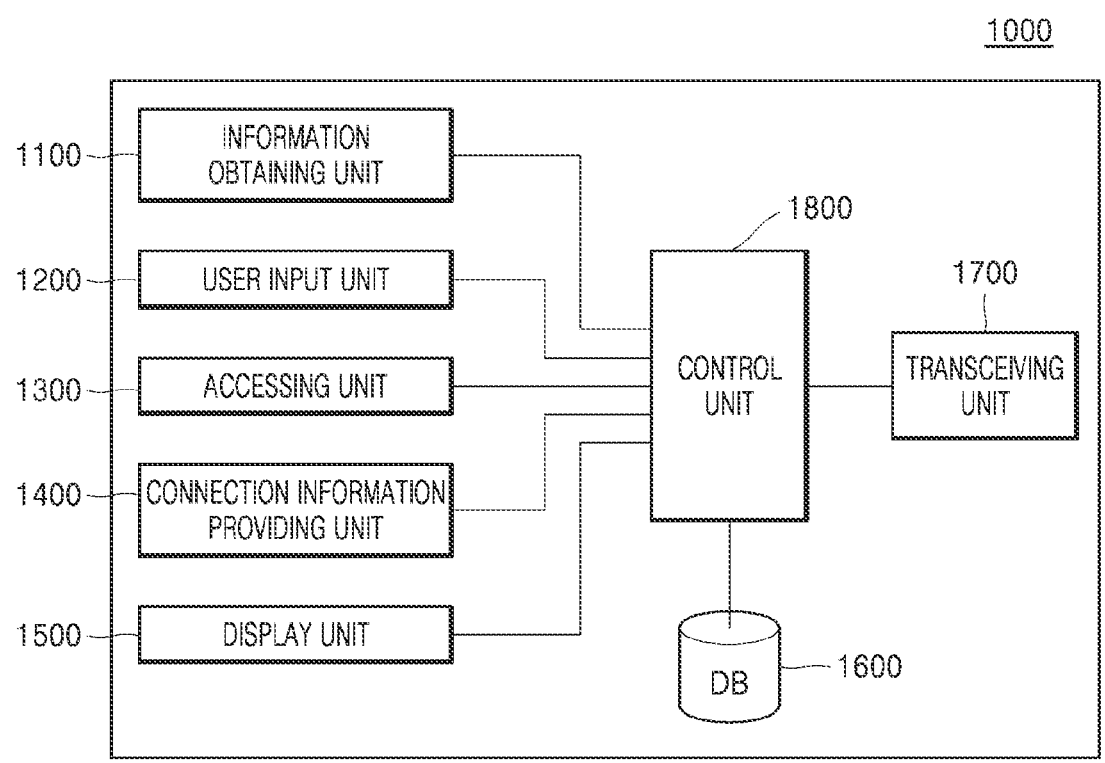
FIG. 9 is a block diagram illustrating a device according to an embodiment of the present disclosure.

FIG. 9 is a block diagram illustrating the device according to an embodiment of the present disclosure.

Referring to FIG. 9, the device 1000 includes an information obtaining unit 1100, a user input unit 1200, an accessing unit 1300, a connection information providing unit 1400, a display unit 1500, a database (DB) 1600, a transceiving unit 1700, and a control unit 1800.

According to various embodiments of the present disclosure, the information obtaining unit 1100 receives device information and password information of the external device 2000 from the external device 2000. The external device 2000 may broadcast the device information and the password information, and the information obtaining unit 1100 may receive the broadcasted device information and the broadcasted password information. For example, the device information may include an SSID, a MAC address, and device type information that relate to the external device 2000. For example, the password information may include a password value and guide information relating to checking the password value.

According to various embodiments of the present disclosure, the user input unit 1200 receives a user input with respect to the device 1000. The user input unit 1200 may receive the user input of the password for accessing the external device 2000.

According to various embodiments of the present disclosure, the password for accessing the external device 2000 may be displayed on a screen of the external device 2000, and a user may input the password, which is displayed on the screen of the external device 2000, into the device 1000. In this case, guide information indicating how to display the password on the screen of the external device 2000 may be displayed on a screen of the device 1000. For example, guide information indicating that the password is displayed on the external device 2000 when a predetermined button of the remote controller 4000 of the external device 2000 is pressed may be displayed on the device 1000.

According to various embodiments of the present disclosure, the password for accessing the external device 2000 may be displayed on an outer surface of the external device 2000 during the manufacture of the external device 2000. In this case, guide information relating to checking the password that is displayed on the outer surface of the external device 2000 may be displayed on the device 1000.

According to various embodiments of the present disclosure, accessing unit 1300 accesses the external device 2000 and the AP 3000 or terminates accessing the external device 2000 and the AP 3000. When the device information is received from the external device 2000, the accessing unit 1300 may terminate accessing the AP 3000. When the password that is input by the user matches with the password that is received from the external device 2000, the device 1000 may discontinue accessing the AP 3000. However, various embodiments of the present disclosure are not limited thereto.

According to various embodiments of the present disclosure, the accessing unit 1300 may store the connection information relating to the AP 3000 in the DB 1600 to be described later. The connection information relating to the AP 3000 may include various types of information that are necessary for accessing the AP 3000 in the Wi-Fi network.

According to various embodiments of the present disclosure, the accessing unit 1300 may compare the password that is input by the user with the password that is received from the external device 2000, so that the accessing unit 1300 may determine whether the device 1000 accesses the external device 2000. However, various embodiments of the present disclosure are not limited thereto, and thus, the accessing unit 1300 may provide the input password to the external device 2000 and may allow the external device 2000 to determine whether to permit the access of the device 1000.

According to various embodiments of the present disclosure, the accessing unit 1300 may access the external device 2000 based on the device information that is received from the external device 2000. The accessing unit 1300 may access the external device 2000 that operates in an AP mode, based on the SSID and MAC address of the external device 2000, and may transmit the password, which is received by the user input unit 1200, to the external device 2000 so as to access the external device 2000.

According to various embodiments of the present disclosure, the accessing unit 1300 may terminate accessing the external device 2000. After the accessing unit 1300 receives, from the external device 2000, notice information indicating that the external device 2000 accesses the AP 3000, and then the accessing unit 1300 checks that the external device 2000 accesses the AP 3000, the accessing unit 1300 may terminate accessing the external device 2000. However, various embodiments of the present disclosure are not limited thereto.

According to various embodiments of the present disclosure, the accessing unit 1300 may re-access the AP 3000. For example, the accessing unit 1300 may re-access the AP 3000 based on the connection information relating to the AP 3000 which is stored in the DB 1600.

According to various embodiments of the present disclosure, the connection information providing unit 1400 provides the connection information to the external device 2000. The connection information providing unit 1400 may provide the connection information relating to the AP 3000, which is stored in the DB 1600, to the external device 2000 that is connected with the device 1000. When the device 1000 accesses the external device 2000, the external device 2000 may request the connection information relating to the AP 3000 to the device 1000, and in response to the request from the external device 2000, the connection information providing unit 140 may transmit, to the external device 2000, the connection information that is stored in the DB 1600.

According to various embodiments of the present disclosure, the display unit 1500 displays guide information for a communication connection with the external device 2000 via the AP 3000. When a network connection request including the device information is received from the external device 2000, the display unit 1500 may display a button for reception of a user input for the network connection. The display unit 1500 may also display a user interface for a password input. According to various embodiments of the present disclosure, the display unit 1500 may display guide information on the user interface, wherein the guide information is used by the user to check a password based on the password information received from the external device 2000.

According to various embodiments of the present disclosure, the DB 1600 stores various types of information required by the device 1000 to discontinue accessing the AP 3000, to access the AP 3000, to transmit the connection information relating to the AP 3000 to the external device 2000, and then to re-access the AP 3000.

According to various embodiments of the present disclosure, the transceiving unit 1700 transceives the various types of information required by the device 1000 so as to discontinue accessing the AP 3000, to access the AP 3000, to transmit the connection information relating to the AP 3000 to the external device 2000, and then to re-access the AP 3000.

According to various embodiments of the present disclosure, the control unit 1800 controls all operations of the device 1000. For example, the control unit 1800 controls the information obtaining unit 1100, the user input unit 1200, the accessing unit 1300, the connection information providing unit 1400, the display unit 1500, the DB 1600, and the transceiving unit 1700 so as to allow the device 1000 to discontinue accessing the AP 3000, to access the AP 3000, to transmit the connection information relating to the AP 3000 to the external device 2000, and then to re-access the AP 3000.

According to various embodiments of the present disclosure, some or all of the information obtaining unit 1100, the user input unit 1200, the accessing unit 1300, the connection information providing unit 1400, the display unit 1500, the transceiving unit 1700, and the control unit 1800 may operate by a software module. However, various embodiments of the present disclosure are not limited thereto.

According to various embodiments of the present disclosure, some of the information obtaining unit 1100, the user input unit 1200, the accessing unit 1300, the connection information providing unit 1400, the display unit 1500, the transceiving unit 1700, and the control unit 1800 may operate by hardware.

According to various embodiments of the present disclosure, at least some of the information obtaining unit 1100, the user input unit 1200, the accessing unit 1300, the connection information providing unit 1400, the display unit 1500, and the transceiving unit 1700 may be included in the control unit 1800, and the control unit 1800 and at least some of the information obtaining unit 1100, the user input unit 1200, the accessing unit 1300, the connection information providing unit 1400, the display unit 1500, and the transceiving unit 1700 may operate by one processor. However, various embodiments of the present disclosure are not limited thereto.

Figure 10:
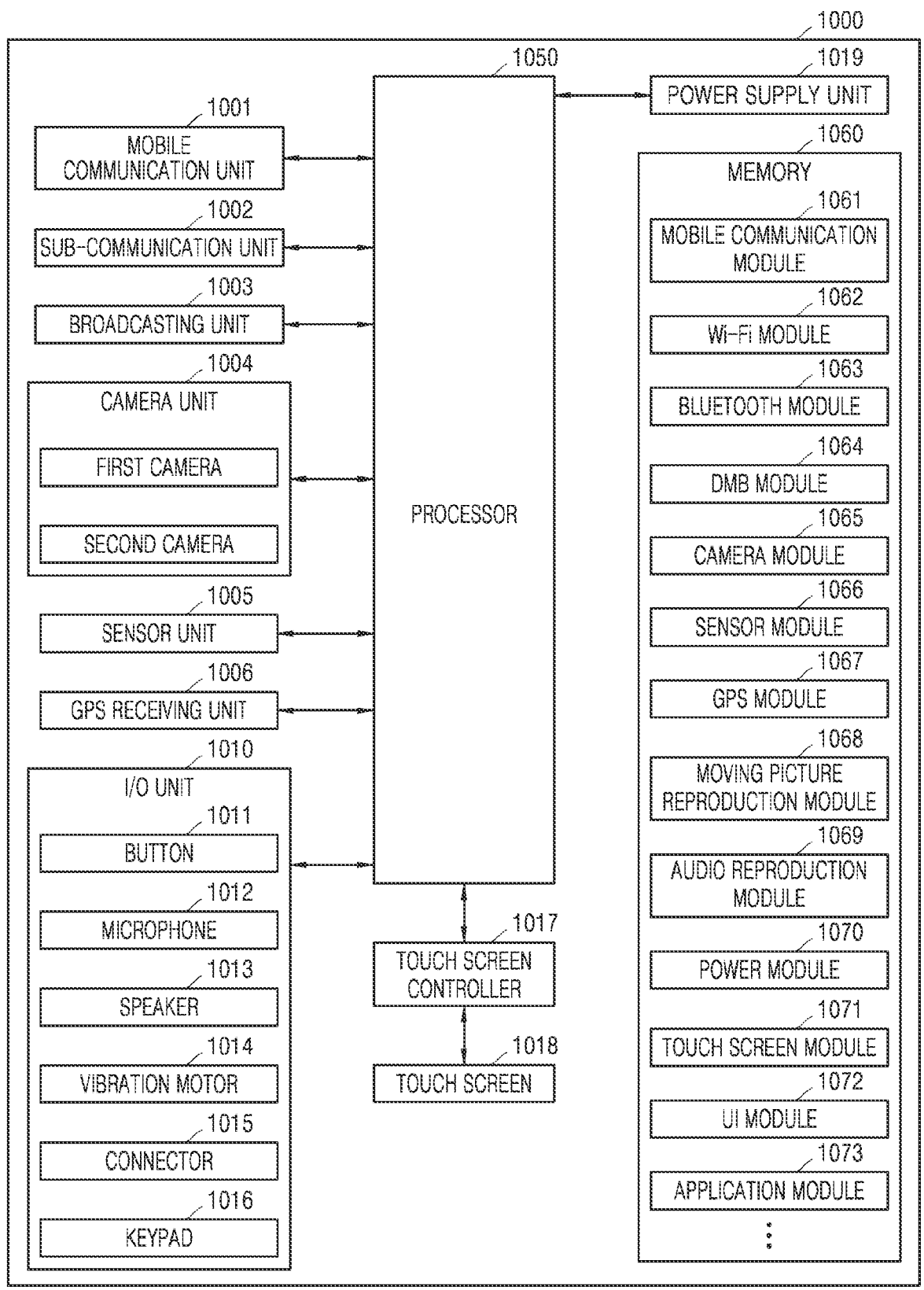
FIG. 10 is a block diagram illustrating a device according to an embodiment of the present disclosure.

FIG. 10 is a block diagram illustrating a device according to an embodiment of the present disclosure.

Referring to FIG. 10, a device 1000 may include a mobile communication unit 1001, a sub-communication unit 1002, a broadcasting unit 1003, a camera unit 1004, a sensor unit 1005, a GPS receiving unit 1006, an Input/Output (I/O) unit 1010, a touch screen controller 1017, a touch screen 1018, a power supply unit 1019, a processor 1050, and a memory 1060.

According to various embodiments of the present disclosure, the mobile communication unit 1001 performs a call set-up, data communication, or the like with a base station via a cellular network such as third Generation (3G)/fourth Generation (4G).

According to various embodiments of the present disclosure, the sub-communication unit 1002 performs a function for short-distance communication such as Bluetooth or NFC.

According to various embodiments of the present disclosure, the broadcasting unit 1003 receives a Digital Multimedia Broadcasting (DMB) signal.

According to various embodiments of the present disclosure, the camera unit 1004 includes a lens and optical elements used to capture a still image or a moving picture.

According to various embodiments of the present disclosure, the sensor unit 1005 may include a gravity sensor for sensing motion of the device 1000, an illuminance sensor for sensing intensity of light, a proximity sensor for sensing proximity of a person, a motion sensor for sensing motion of a person, and/or the like.

According to various embodiments of the present disclosure, the GPS receiving unit 1006 receives a GPS signal from a satellite. By using the GPS signal, various services may be provided to a user.

According to various embodiments of the present disclosure, the Input/Output (I/O) unit 1010 provides an interface for the external device 2000 or a person, and includes a button 1011, a microphone 1012, a speaker 1013, a vibration motor 1014, a connector 1015, a keypad 1016, and/or the like.

According to various embodiments of the present disclosure, the touch screen 1018 receives a touch input by the user.

According to various embodiments of the present disclosure, the touch screen controller 1017 transfers, to a processor 1050, a touch input that is input via the touch screen 1018.

According to various embodiments of the present disclosure, the power supply unit 1019 is connected to a battery or an external power source so as to supply power for the device 1000.

The processor 1050 establishes a wireless Local Area Network (LAN) link by executing programs stored in a memory 1060.

The programs stored in the memory 1060 may be divided into a plurality of modules according to the respective functions thereof. For example, the programs stored in the memory 1060 may be divided into a mobile communication module 1061, a Wi-Fi module 1062, a Bluetooth module 1063, a DMB module 1064, a camera module 1065, a sensor module 1066, a GPS module 1067, a moving picture reproduction module 1068, an audio reproduction module 1069, a power module 1070, a touch screen module 1071, a User Interface (UI) module 1072, an application module 1073, and/or the like.

Functions of the modules may be intuitively deduced from the respective titles thereof, by one of ordinary skill in the art, and thus, only the application module 1073 is described below. The application module 1073 may allow the device 1000 to discontinue accessing the AP 3000, to access the AP 3000, to transmit the connection information relating to the AP 3000 to the external device 2000, and then to re-access the AP 3000.

According to various embodiments of the present disclosure, the application module 1073 receives device information and password information of the external device 2000 from the external device 2000. For example, the application module 1073 may receive the device information and the password information by using at least one of the Wi-Fi module 1062, the Bluetooth module 1063, and the like. However, various embodiments of the present disclosure are not limited thereto. For example, the application module 1073 may receive the device information and the password information by using another communication technology.

According to various embodiments of the present disclosure, the application module 1073 receives a user input via the I/O unit 1010 and the touch screen 1018.

According to various embodiments of the present disclosure, the application module 1073 accesses or terminates accessing the external device 2000 and the AP 3000. When the device information is received from the external device 2000, the application module 1073 may discontinue accessing the AP 3000 by using the Wi-Fi module 1062. When a password that is input by the user matches with a password that is received from the external device 2000, the application module 1073 may discontinue accessing the AP 3000 but various embodiments of the present disclosure are not limited thereto.

According to various embodiments of the present disclosure, the application module 1073 may store connection information relating to the AP 3000 in the memory 1060. The application module 1073 may compare the password that is input by the user with the password that is received from the external device 2000, so that the application module 1073 may determine whether to access the external device 2000. However, various embodiments of the present disclosure are not limited thereto, and thus, the application module 1073 may provide the input password to the external device 2000 and may allow the external device 2000 to determine whether to permit the access of the device 1000.

According to various embodiments of the present disclosure, the application module 1073 may access the external device 2000 by using the Wi-Fi module 1062. The application module 1073 may access the external device 2000 that operates in an AP mode, based on an SSID and MAC address of the external device 2000.

According to various embodiments of the present disclosure, the application module 1073 may terminate accessing the external device 2000 by using the Wi-Fi module 1062 and then may re-access the device 1000 to the AP 3000.

According to various embodiments of the present disclosure, the application module 1073 may provide the connection information relating to the AP 3000, which is stored in the memory 1060, to the external device 2000 by using the Wi-Fi module 1062.

According to various embodiments of the present disclosure, the application module 1073 may display guide information on the touch screen 1018, wherein the guide information is for the communication connection with the external device 2000 via the AP 3000.

Figure 11:
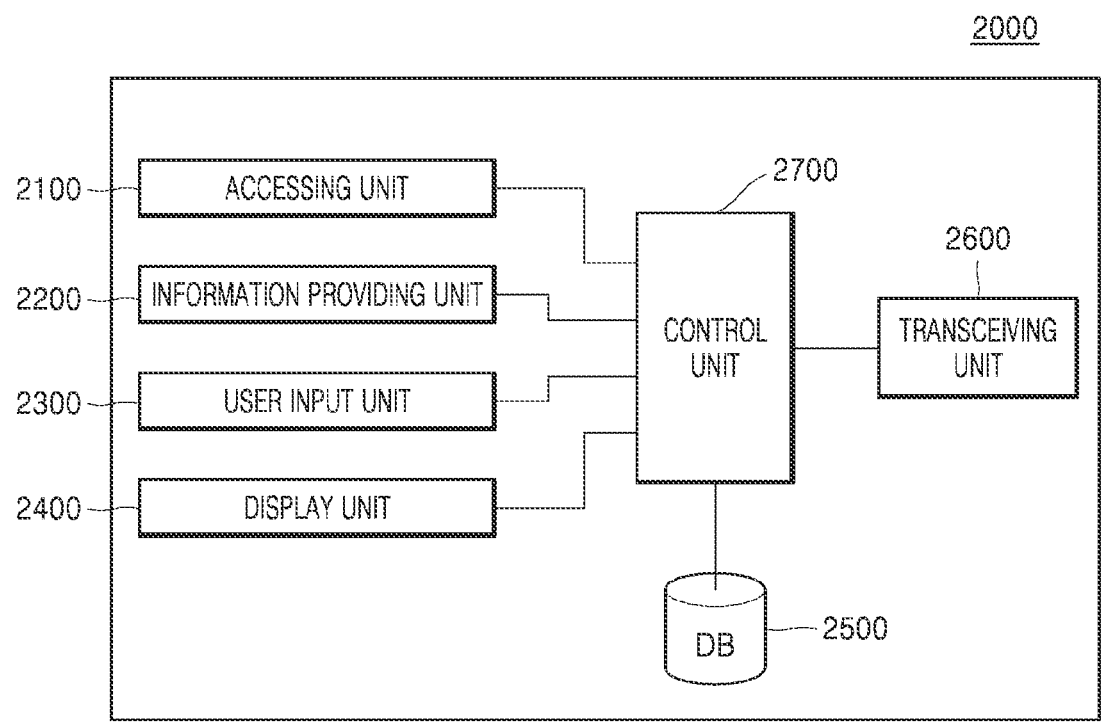
FIG. 11 is a block diagram illustrating an external device according to an embodiment of the present disclosure.

FIG. 11 is a block diagram illustrating an external device according to an embodiment of the present disclosure.

Referring to FIG. 11, the external device 2000 includes an accessing unit 2100, an information providing unit 2200, a user input unit 2300, a display unit 2400, a DB 2500, a transceiving unit 2600, and a control unit 2700.

According to various embodiments of the present disclosure, the accessing unit 2100 changes a networking mode of the external device 2000, and accesses at least one of the device 1000 and the AP 3000. The accessing unit 2100 may change the networking mode of the external device 2000 into an AP mode so as to allow the external device 2000 to be connected with the device 1000. According to various embodiments of the present disclosure, the accessing unit 2100 may access the device 1000 in response to an access request from the device 1000. When the accessing unit 2100 receives a correct password from the device 1000, the accessing unit 2100 may access the device 1000. However, various embodiments of the present disclosure are not limited thereto.

According to various embodiments of the present disclosure, the accessing unit 2100 may receive connection information relating to the AP 3000 from the device 1000 and may access the AP 3000 by using the connection information. When the connection information is received, the accessing unit 2100 may terminate the connection with the device 1000 and may change the networking mode of the external device 2000 into a client mode. Thereafter, the accessing unit 2100 may access the AP 3000 by using the connection information.

According to various embodiments of the present disclosure, the information providing unit 2200 provides device information and password information to the device 1000. The device information and the password information that are provided to the device 1000 may be used by the device 1000 so as to access the external device 2000.

According to various embodiments of the present disclosure, the information providing unit 2200 may provide, to the remote controller 4000, a password for accessing the external device 2000. The password that is provided to the remote controller 4000 may be displayed on a screen of the remote controller 4000, and a user may check the password displayed on the screen of the remote controller 4000 and then may input the password into the device 1000.

According to various embodiments of the present disclosure, the user input unit 2300 receives a user input with respect to the external device 2000.

According to various embodiments of the present disclosure, the display unit 2400 displays guide information for the network connection, and the password. The display unit 2400 may display predetermined guide information so that the user may communication-connect the device 1000 and the external device 2000 via the AP 3000. According to various embodiments of the present disclosure, the display unit 2400 may display the password for connection with the external device 2000, in response to a predetermined user input.

According to various embodiments of the present disclosure, the DB 2500 stores various types of information required by the external device 2000 so as to access the device 1000, to receive the connection information relating to the AP 3000 from the device 1000, and then to access the AP 3000.

According to various embodiments of the present disclosure, the transceiving unit 2600 transceives the various types of information required by the external device 2000 so as to access the device 1000, to receive the connection information relating to the AP 3000 from the device 1000, and then to access the AP 3000.

According to various embodiments of the present disclosure, the control unit 2700 controls the accessing unit 2100, the information providing unit 2200, the user input unit 2300, the display unit 2400, the DB 2500, and the transceiving unit 2600 so as to allow the external device 2000 to access the device 1000, to receive the connection information relating to the AP 3000 from the device 1000, and then to access the AP 3000.

According to various embodiments of the present disclosure, some or all of the accessing unit 2100, the information providing unit 2200, the user input unit 2300, the display unit 2400, the transceiving unit 2600, and the control unit 2700 may operate by a software module. However, various embodiments of the present disclosure are not limited thereto. According to various embodiments of the present disclosure, some of the accessing unit 2100, the information providing unit 2200, the user input unit 2300, the display unit 2400, the transceiving unit 2600, and the control unit 2700 may operate by hardware.

According to various embodiments of the present disclosure, at least some of the accessing unit 2100, the information providing unit 2200, the user input unit 2300, the display unit 2400, and the transceiving unit 2600 may be included in the control unit 2700. According to various embodiments of the present disclosure, the control unit 2700 and at least some of the accessing unit 2100, the information providing unit 2200, the user input unit 2300, the display unit 2400, and the transceiving unit 2600 may operate by one processor. However, various embodiments of the present disclosure are not limited thereto.

Various embodiments of the present disclosure may be embodied as a non-transitory recording medium (e.g., a program module to be executed in computers), which include computer-readable commands. The non-transitory computer-readable storage medium may include any usable medium that may be accessed by computers, volatile and non-volatile medium, and detachable and non-detachable medium. According to various embodiments of the present disclosure, the non-transitory computer-readable storage medium may include a computer storage medium and a communication medium. The non-transitory computer-readable storage medium includes all of volatile and non-volatile medium, and detachable and non-detachable medium which are designed to store information including computer readable commands, data structures, program modules or other data. The communication medium includes computer-readable commands, a data structure, a program module, and other transmission mechanisms, and includes other information transmission mediums.

The present disclosure may, however, be embodied in many different forms and should not be construed as being limited to the various embodiments set forth herein; rather, these various embodiments are provided so that this disclosure will be thorough and complete, and will fully convey the inventive concept to those of ordinary skill in the art. For example, configuring elements that are singular forms may be executed in a distributed fashion, and also, configuring elements that are distributed may be combined and then executed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method, performed by an electronic device, for connecting to an external access point (AP), the method comprising:
setting a networking mode of the electronic device to an AP mode, wherein, in the AP mode, the electronic device operates as an AP in a Wi-Fi network;
while the electronic device is in the AP mode:
broadcasting password information for connecting to the electronic device;
based on an input of a password corresponding to the password information, establishing a first communication interface with an external device in the AP mode; and
receiving, from the external device via the established first communication interface, connection information related to the external AP in the AP mode; and
based on the receiving of the connection information related to the external AP:
changing the networking mode of the electronic device from the AP mode to a client mode; and
establishing a second communication interface with the external AP by using the connection information related to the external AP in the client mode,
wherein the password information for connecting to the electronic device comprises a guide information relating to checking the password for establishing the first communication interface with the electronic device in the AP mode.

2. The method of claim 1,
wherein the external device previously connected to the external AP before transmitting, to the electronic device, the connection information related to the external AP, and
wherein the connection information related to the external AP is based on the external device having previously connected to the external AP.

3. The method of claim 1, wherein the guide information indicates predetermined letters corresponding to the password.

4. The method of claim 1, further comprising:
receiving, from the external device via the external AP, a command associated with a function of the electronic device; and
executing the received command.

5. The method of claim 1, wherein the setting of the networking mode of the electronic device to the AP mode comprises:
receiving an input for setting the networking mode of the electronic device to the AP mode; and
indicating, via a user interface of the electronic device, that the electronic device is set to the AP mode.

6. The method of claim 1, wherein the receiving of the connection information comprises receiving information which is stored in the external device.

7. An electronic device comprising:
a transceiver;
a memory; and
at least one processor electrically connected to the transceiver and the memory,
wherein the memory stores one or more computer programs including instructions which, when executed by the at least one processor, cause the electronic device to:
set a networking mode of the electronic device to an AP mode, wherein, in the AP mode, the electronic device operates as an AP in a Wi-Fi network,
while the electronic device is in the AP mode:
broadcast, via the transceiver, password information for connecting to the electronic device,
based on an input of a password corresponding to the password information, establish a first communication interface with an external device in the AP mode, and
receive, from the external device via the established first communication interface, connection information related to an external AP in the AP mode,
based on the receiving of the connection information related to the external AP:
change the networking mode of the electronic device from the AP mode to a client mode, and
set a networking mode of the electronic device to a client mode, and
while the electronic device is in the client mode, establish a second communication interface with the external AP by using the connection information related to the external AP, and
wherein the password information for connecting to the electronic device comprises a guide information relating to checking the password for establishing the first communication interface with the electronic device in the AP mode.

8. The electronic device of claim 7,
wherein the external device previously connected to the external AP before transmitting, to the electronic device, the connection information related to the external AP, and
wherein the connection information related to the external AP is based on the external device having previously connected to the external AP.

9. The electronic device of claim 8, wherein the external AP is a predetermined AP to be accessed by the electronic device.

10. The electronic device of claim 7, wherein the connection information related to the external AP is stored in the external device.

11. The electronic device of claim 7, wherein the one or more computer programs further include instructions which, when executed by the at least one processor, cause the electronic device to:
receive, from the external device via the external AP, a command associated with a function of the electronic device, and
execute the received command.

12. The electronic device of claim 7, further comprising:
a user interface, wherein, to set the networking mode of the electronic device to the AP mode, the one or more computer programs further include instructions which, when executed by the at least one processor, cause the electronic device to:

receive an input for setting the networking mode of the electronic device to the AP mode, and indicate, via the user interface of the electronic device, that the electronic device is set to the AP mode.

13. The electronic device of claim 7, wherein the guide information indicates predetermined letters corresponding to the password.

14. A non-transitory computer-readable storage medium configured to store one or more computer programs including instructions that, when executed by at least one processor of an electronic device, cause the at least one processor to control for:

setting a networking mode of the electronic device to an AP mode, wherein, in the AP mode, the electronic device operates as an AP in a Wi-Fi network;

while the electronic device is in the AP mode:

broadcasting password information for connecting to the electronic device;

based on an input of a password corresponding to the password information, establishing a first communication interface with an external device in the AP mode; and receiving, from the external device via the established first communication interface, connection information related to the external AP in the AP mode; and based on the receiving of the connection information related to the external AP:

changing the networking mode of the electronic device from the AP mode to a client mode; and establishing a second communication interface with the external AP by using the connection information related to the external AP in the client mode, wherein the password information for connecting to the electronic device comprises a guide information relating to checking the password for establishing the first communication interface with the electronic device in the AP mode.

* * * * *